United States Patent Office 3,012,038
Patented Dec. 5, 1961

3,012,038
PROCESS FOR PREPARING CARBOXYLIC
ACID BY OXIDATION
William Alexander O'Neill, Harrogate, and Arthur William Charles Taylor and Fred Dean, Norton-on-Tees, England, assignors to Imperial Chemical Industries Limited, London, England, a corporation of Great Britain
No Drawing. Filed Oct. 28, 1957, Ser. No. 692,542
Claims priority, application Great Britain Nov. 5, 1956
4 Claims. (Cl. 260—295)

This invention relates to the oxidation of organic compounds.

There have already been described processes in which alkyl or haloalkyl aromatic compounds or heterocyclic compounds of aromatic character, or their closely related oxygen-containing derivatives, or such compounds containing a polar group or groups, or aliphatic or alicyclic compounds are oxidised by means of molecular oxygen or ozone in the liquid phase in the presence of a halogen, and preferably of a catalyst comprising the halide of a metal of variable valence. The bromides are preferred because of their greater effectiveness. Preferably the catalyst comprises the mixed bromides of cobalt and manganese but a mixture of cobalt and lead bromides, or of lead and manganese bromides can also be used, but with poorer results.

When the starting compound is liquid under the oxidation conditions it is frequently unnecessary to employ added solvent. When a solvent is used it is desirable that it be one which is less liable to oxidation than the starting material. An advantage of using a solvent is that it permits higher concentrations of catalyst to be used. The molecular oxygen may be fed as such, or as air or diluted air.

Suitable solvents comprise: lower aliphatic carboxylic acids; aromatic hydrocarbons; halogen derivatives of benzene, such as ortho-dichlorobenzene; aromatic carboxylic acids; and water.

Suitable proportions of the catalytic substances are from 1 to 0.0005 gramme atom of total metal per gramme mole of starting material, preferably from 0.1 to 0.005 gramme atom of total metal per gramme mole of starting material. The ratio of one metal to the other may be varied within these ranges of total metal. Preferably the ratio of manganese to cobalt is about 2:1, although up to about 9:1 gives good results. Suitable proportions of manganese dibromide ($MnBr_2.4H_2O$) and of cobaltous bromide ($CoBr_2.6H_2O$) are respectively (0.1 to 200%), preferably (0.65 to 0.85%), and (0.05 to 100%), preferably (0.33 to 0.48%) by weight of the starting compound assuming a molecular weight of 100 and proportionately for other compounds.

Examples of starting materials that may be oxidised according to the process of the invention are: para-di-isopropylbenzene, para-xylene, toluene, cumene, mesitylene, ortho-xylene, metal-xylene, methyl naphthalene, methyl pyridine, benzyl benzoate, methyl-paratoluate, benzyl alcohol, benzaldehyde, para-toluic acid, ethyl benzene, n-propyl benzene, beta-methyl-n-propyl benzene, diphenyl ethane, ortho- and para-halomethyl toluenes, especially the chloro- and bromo-compounds, para- and meta-chloro-toluene, para- and meta-toluene sulphonamides, para- and meta-cresyl benzoates, para-toluene sulphonic acid, methyl para-toluene sulphonate, para-toluamide, para-nitro-toluene, cyclohexene, cyclohexane, methyl cyclohexene, paraffins, e.g., pentane, propionaldehyde, n-butyraldehyde, cyclohexanone, beta-beta'-dichlorodiethyl ether.

Temperatures of from ambient up to 300° C., e.g., 50° to 250° C. may be used, and atmospheric, or superatmospheric pressures of up to 200 ats. gauge.

In all these processes there is considerable tendency for oxidation and/or corrosion of the materials of which the reaction vessel is constructed to occur, and for this reason it has been preferred to use glass. However, glass suffers from the disadvantage that it is not structurally strong nor shock resistant, and its use in large scale processes suffers from these and other disadvantages.

We have now found that in oxidation processes of the above sort in which halogen, hydrogen halide or metallic halides, especially bromine, hydrobromic acid or metallic bromides are present, a little oxidation, or corrosion is experienced when the reactor is constructed of, or lined with, a metal selected from: titanium, tantalum, and hafnium or their alloys.

According to the present invention, therefore, there is provided a process which comprises oxidising an organic compound in the liquid phase by means of an oxidising gas comprising molecular oxygen or ozone or combinations thereof, in the presence of halogen, hydrogen halide, or a metallic halide in a reaction zone which presents surfaces of titanium, tantalum or hafnium or their alloys to the liquid and gaseous phases therein. In such processes the oxidising gas is frequently fed as a stream containing at least 10 volume percent of oxygen, ozone, or combinations thereof, and the present invention is of especial value in relation to oxidation so operated.

A further advantage of the invention is that because of the oxidation and corrosion resistant properties of the said metals, contamination of the desired product is decreased considerably or even substantially eliminated.

The reactor employed for the oxidation process may be fabricated of the aforesaid metals or may be lined with them. Thus the reactor may be formed of mild steel clad with, e.g., titanium. It is preferred, because of their high corrosion resistant properties, to use the substantially pure metals. Auxiliary parts such as stirrers, atomiser nozzles for the introduction of the oxygen, ozone or air, may also be fabricated of the aforesaid metals, but parts not subjected to tensile stress or in which high strength is unnecessary may be of glass.

Outstandingly good results are obtained with reaction vessels constructed of tantalum, and the use of titanium also gives good results.

The following data have been obtained with a bromine assisted oxidation process in which the reaction mixture comprised 100 parts by weight of benzoic acid, 2 parts by weight of manganese bromide ($MnBr_2.4H_2O$), 1 part by weight of cobaltous bromide ($CoBr_2.6H_2O$), 5 parts by weight of sodium bromide and 10 parts by weight of phthalic anhydride, and air was passed through the reaction mixture maintained at 150° C. at a rate of 10 litres per hour. These results were obtained after 7 and 21 days continuous operation.

| Reactor Material | Rate of Corrosion calculated as mm./year | |
|---|---|---|
| | Test at 7 days | Test at 21 days |
| Mild steel | 3.0 | |
| 18/10/Mo/Ti steel | 2.8 | |
| Monel metal | 0.6 | |
| Copper | 2.8 | |
| Titanium | 0.07 | 0.006 |
| Tantalum | 0.0027 | Nil |
| Zirconium | 0.18 | |
| "Everdur" | 3.4 | |
| Aluminium bronze | 6.6 | |

From the engineering viewpoint, a maximum rate of corrosion of 0.1 mm. per year at 7 days test is regarded as satisfactory. The extremely good results with tantalum and the good results with titanium are thus evident.

Examination of the product obtained by carrying out the oxidation of ortho-xylene to phthalic anhydride in the presence of benzoic acid and of a mixed cobalt bromide/manganese bromide catalyst with titanium and tantalum present showed that neither of these metals has an undesirable chemical effect either on the reaction or on the product.

As a further feature of the invention ancillary parts of the equipment in which little or no oxygen is present, e.g., pipe lines, storage tanks may also be constructed of the said metals. A test conducted on a reaction mixture of the same composition as that described above, and in similar manner, except that nitrogen was passed through the mixture at the same flow rate instead of oxygen, gave the following data:

|  | Rate of corrosion calculated as mm./year—Test at 21 days |
|---|---|
| Titanium | 0.005 |
| Tantalum | Nil |

We claim:
1. In the process for the production of carboxylic acids which comprises oxidizing in the liquid phase a compound selected from the group consisting of para-di-isopropyl-benzene, para-xylene, toluene, cumene, mesitylene, ortho-xylene, meta-xylene, methyl naphthalene, methyl pyridine, benzyl benzoate, methyl-para-toluate, benzyl alcohol, benzaldehyde, para-toluic acid, ethyl benzene, n-propyl benzene, beta-methyl-n-propyl benzene, diphenyl ethane, ortho- and para-chloromethyl and bromo-methyl toluenes, para- and meta-chloro-toluene, para- and meta-toluene sulphonamides, para- and meta-cresyl benzoates, para-toluene sulphonic acid, methyl para-toluene sulphonate, para-toluamide, para-nitro-toluene, cyclohexane, cyclohexene, methyl cyclohexene, pentane, propionaldehyde, n-butyraldehyde, cyclohexanone, and beta-beta'-dichlorodiethyl ether, with a gas containing free oxygen in the presence of a bromide catalyst containing a heavy metal selected from the group consisting of cobalt and manganese, at from ambient temperature up to about 300° C. and at a pressure from atmospheric up to about 200 atmospheres, the improvement which consists essentially of conducting said processes in a reaction zone which presents surfaces of substantially pure titanium metal, to the liquid and gaseous phases therein.

2. The process of claim 1, wherein said gas contains at least 10 volume percent of molecular oxygen.

3. The process of claim 1, wherein a solvent is present selected from the group consisting of lower aliphatic carboxylic acids, aromatic hydrocarbons, halo-benzenes, aromatic carboxylic acids and water.

4. The process of claim 1, in which all surfaces presented to the liquid and vapor phases containing said reaction zone and the reactants introduced therein and the reaction products extracted therefrom consist of said metal.

References Cited in the file of this patent

UNITED STATES PATENTS

| 1,511,494 | Baum | Oct. 14, 1924 |
| 1,923,630 | Looker et al. | Aug. 22, 1933 |
| 1,995,647 | Pier et al. | Mar. 26, 1935 |
| 2,245,528 | Loder | June 10, 1941 |
| 2,444,924 | Farkas et al. | July 13, 1948 |
| 2,530,509 | Cook | Mar. 21, 1950 |
| 2,552,268 | Emerson et al. | May 8, 1951 |
| 2,644,820 | Gresham | July 7, 1953 |
| 2,768,200 | Busby | Oct. 23, 1956 |
| 2,789,988 | Brown | Apr. 23, 1957 |
| 2,800,504 | Elce et al. | July 23, 1957 |
| 2,833,816 | Saffer et al. | May 6, 1958 |
| 2,833,820 | Egbert | May 6, 1958 |
| 2,846,450 | Bloch | Aug. 5, 1958 |
| 2,858,334 | Landan | Oct. 28, 1958 |

OTHER REFERENCES

Tantalum Tapered Condensers (copyright 1939), Fansteel Metallurgical Corp.

Taylor, Ind. Eng. Chem. (April 1950), p. 639.